(12) United States Patent
Izenberg et al.

(10) Patent No.: US 10,243,865 B2
(45) Date of Patent: Mar. 26, 2019

(54) COMBINED HARDWARE/SOFTWARE FORWARDING MECHANISM AND METHOD

(71) Applicant: Marvell Israel (M.I.S.L) Ltd., Yokneam (IL)

(72) Inventors: Erez Izenberg, Tel Aviv (IL); Alon Pais, D. N. Shimshon (IL); Ruven Torok, Tel Aviv (IL); Dimitry Melts, Tel Aviv (IL); Yuval Caduri, Zur-Yigal (IL); Dmitri Epshtein, Nesher (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 26 days.

(21) Appl. No.: 15/454,759

(22) Filed: Mar. 9, 2017

(65) Prior Publication Data

US 2017/0180264 A1   Jun. 22, 2017

Related U.S. Application Data

(63) Continuation of application No. 14/499,759, filed on Sep. 29, 2014, now Pat. No. 9,614,755, which is a
(Continued)

(51) Int. Cl.
*H04L 12/28* (2006.01)
*H04L 12/801* (2013.01)
(Continued)

(52) U.S. Cl.
CPC .............. *H04L 47/33* (2013.01); *H04L 45/30* (2013.01); *H04L 45/60* (2013.01);
(Continued)

(58) Field of Classification Search
CPC ........... H04L 29/0653; H04L 29/06095; H04L 49/3009; H04L 49/309; H04L 45/74
See application file for complete search history.

(56) References Cited

U.S. PATENT DOCUMENTS 6,751,191 B1     6/2004  Kanekar et al.
6,981,054 B1 *  12/2005  Krishna ................. H04L 47/10
                                                              370/236
(Continued)

OTHER PUBLICATIONS

IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).
(Continued)

*Primary Examiner* — Siren Wei

(57) ABSTRACT

A network device includes (i) a software forwarding engine, and (ii) a hardware forwarding engine, wherein the software forwarding engine is implemented using a processor executing machine readable instructions. The network device analyzes a header of a received packet to determine i) whether the received packet belongs to any flows of packets already known to the network device, and ii) a packet type of the received packet. The network device selects one of the software forwarding engine or the hardware forwarding engine to process the received packet based on i) whether the received packet belongs to any flows of packets already known to the network device, and ii) the determined packet type, including selecting the software forwarding engine when it is determined that the received packet does not belong to any flow of packets already known to the network device.

18 Claims, 5 Drawing Sheets

Related U.S. Application Data continuation of application No. 13/037,459, filed on Mar. 1, 2011, now Pat. No. 8,848,715.

(60) Provisional application No. 61/314,328, filed on Mar. 16, 2010.

(51) Int. Cl.
| | | |
|---|---|---|
| *H04L 12/773* | (2013.01) | |
| *H04L 12/725* | (2013.01) | |
| *H04L 12/851* | (2013.01) | |
| *H04L 29/06* | (2006.01) | |

(52) U.S. Cl.
CPC ...... *H04L 47/2441* (2013.01); *H04L 47/2483* (2013.01); *H04L 69/22* (2013.01)

(56) References Cited

U.S. PATENT DOCUMENTS

| | | | |
|---|---|---|---|
| 7,020,143 B2 | 3/2006 | Zdan | |
| 7,023,851 B2 | 4/2006 | Chakravorty | |
| 7,474,653 B2 | 1/2009 | Herriott et al. | |
| 7,509,407 B2 | 3/2009 | Miller et al. | |
| 7,613,768 B2 | 11/2009 | Harville et al. | |
| 7,742,471 B2 | 6/2010 | Sreejith et al. | |
| 8,054,744 B1 | 11/2011 | Bishara et al. | |
| 8,059,658 B1* | 11/2011 | Rovner | H04L 45/00 370/395.1 |
| 8,111,690 B2 | 2/2012 | Hussain et al. | |
| 8,327,047 B2 | 12/2012 | Pais et al. | |
| 8,448,234 B2 | 5/2013 | Mondaeev et al. | |
| 8,599,859 B2 | 12/2013 | Pais et al. | |
| 8,848,715 B2 | 9/2014 | Izenberg et al. | |
| 2002/0044553 A1 | 4/2002 | Chakravorty | |
| 2002/0191622 A1 | 12/2002 | Zdan | |
| 2003/0058880 A1 | 3/2003 | Sarkinen et al. | |
| 2003/0223361 A1* | 12/2003 | Hussain | H04L 43/026 370/230 |
| 2004/0236826 A1 | 11/2004 | Harville et al. | |
| 2005/0125424 A1* | 6/2005 | Herriott | H04L 69/22 |
| 2005/0261985 A1 | 11/2005 | Miller et al. | |
| 2005/0270977 A1 | 12/2005 | King et al. | |
| 2006/0029016 A1 | 2/2006 | Peles | |
| 2007/0121616 A1* | 5/2007 | Sreejith | H04L 12/66 370/389 |
| 2007/0211626 A1* | 9/2007 | Gooch | H04L 47/10 370/229 |
| 2008/0101233 A1* | 5/2008 | Shi | G06F 9/505 370/235 |
| 2008/0201772 A1 | 8/2008 | Mondaeev et al. | |
| 2009/0154349 A1* | 6/2009 | Bernard | H04Q 11/0067 370/235 |
| 2010/0274893 A1 | 10/2010 | Abdelal et al. | |
| 2011/0066753 A1* | 3/2011 | Wang | H04L 45/586 709/238 |
| 2015/0016451 A1 | 1/2015 | Izenberg et al. | |

OTHER PUBLICATIONS

IEEE Std 802.1Q—2011 (Revision of IEEE Std.802.1Q-2005), "IEEE Standard for Local and Metropolitan Area Networks—Media Access Control (MAC) Bridges and Virtual Bridged Local Area Networks," The Institute of Electrical and Electronics Engineers, Inc., 1,365 pages (Aug. 31, 2011).

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, 363 pages (Feb. 10, 2012).

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).

IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," *The Institute of Electrical and Electronics Engineers, Inc.*, pp. 1-196 (Oct. 2004).

Chen, "Home Network Basis: Transmission Environments and Wired/Wireless Protocols," Prentice Hall, pp. 1-26 (Jul. 2003).

First Office Action in Chinese Application No. 201110064872.0, dated Nov. 21, 2014, with English translation (21 pages).

Second Office Action in Chinese Application No. 201110064872.0, dated Jun. 26, 2015, with English translation (23 pages).

Third Office Action in Chinese Application No. 201110064872.0, dated Sep. 28, 2015, with English translation (18 pages).

Fourth Office Action in Chinese Application No. 201110064872.0, dated Mar. 25, 2016, with English translation (7 pages).

\* cited by examiner

COMBINED HARDWARE/SOFTWARE FORWARDING MECHANISM AND METHOD

CROSS-REFERENCES TO RELATED APPLICATIONS

The present application is a continuation of U.S. patent application Ser. No. 14/499,759, entitled "Combined Hardware/Software Forwarding Mechanism and Method," filed Sep. 29, 2014, which claims the benefit of U.S. patent application Ser. No. 13/037,459, entitled "Combined Hardware/Software Forwarding Mechanism and Method," filed Mar. 1, 2011, now U.S. Pat. No. 8,848,715, which claims the benefit of U.S. Provisional Application No. 61/314,328, entitled "Combined Hardware/Software Forwarding Mechanism and Method," filed on Mar. 16, 2010. The disclosures of all of the applications referenced above are hereby incorporated by reference herein in their entireties.

FIELD OF TECHNOLOGY

The present disclosure relates generally to communication systems and, more particularly, to routers, gateways or forwarding systems such as those used in homes or small offices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Communication equipment such as routers, gateways and other forwarding systems for homes and small offices are designed to connect multiple devices in one network to each other and to another network. Typically, such forwarding systems handle multiple connections of incoming and outgoing streams or data flows. For example, in a home network, a forwarding system may route a streaming video to a television, a gaming session to a computer, and a file download to another computer. A forwarding system generally receives data packets from a source device in a first network, performs packet parsing and classification, queues the packets, and forwards the packets to the appropriate destination device in the second network. Additionally, the forwarding system receives packets from various devices in the second network, and processes and forwards the packets to the first network. Within the forwarding system, the processing of all packets is typically performed either by executing software with a processor such as a CPU (Central Processing Unit), or by using a dedicated hardware forwarding device.

SUMMARY

In an embodiment, a method for forwarding network traffic in a network device includes: receiving a packet at the network device, the network device having (i) a software forwarding engine, and (ii) a hardware forwarding engine, wherein the software forwarding engine and the hardware forwarding engine are configured to determine egress ports of the network device via which received packets are to be transmitted along towards forwarding destinations, and wherein the software forwarding engine is implemented using a processor executing machine readable instructions; analyzing, at the network device, a header of the received packet to determine i) whether the received packet belongs to any flows of packets already known to the network device, and ii) a packet type of the received packet; and selecting, at the network device, one of the software forwarding engine or the hardware forwarding engine to process the received packet based on i) whether the received packet belongs to any flows of packets already known to the network device, and ii) the determined packet type, including selecting the software forwarding engine when it is determined that the received packet does not belong to any flow of packets already known to the network device. The method also includes processing and forwarding, by the network device, the received packet using only the selected one of the software forwarding engine or the hardware forwarding engine and without using the unselected one of the software forwarding engine and the hardware forwarding engine.

In another embodiment, a network device comprises one or more integrated circuits. The one or more integrated circuits include: a processor; a memory coupled to the processor, the memory storing machine readable instructions that, when executed by the processor, cause the processor to implement a software forwarding engine configured to select, using the machine readable instructions, egress ports for transmitting packets from the network device; a hardware forwarding engine configured to select egress ports for transmitting packets from the network device; a classification engine configured to determine whether a received packet belongs to a known flow of packets, and determine a packet type of the received packet; and a selection engine configured to select one of the software forwarding engine or the hardware forwarding engine based on i) whether the received packet belongs to any flows of packets already known to the network device, and ii) the determined packet type. The selection engine is also configured to select the software forwarding engine when it is determined that the received packet does not belong to a known flow of packets. The one or more integrated circuits are configured to process the received packet and to forward the received packet to a selected egress port using only the selected one of the software forwarding engine or the hardware forwarding engine and without using the unselected one of the software forwarding engine and the hardware forwarding engine.

DETAILED DESCRIPTION

Figure 1:
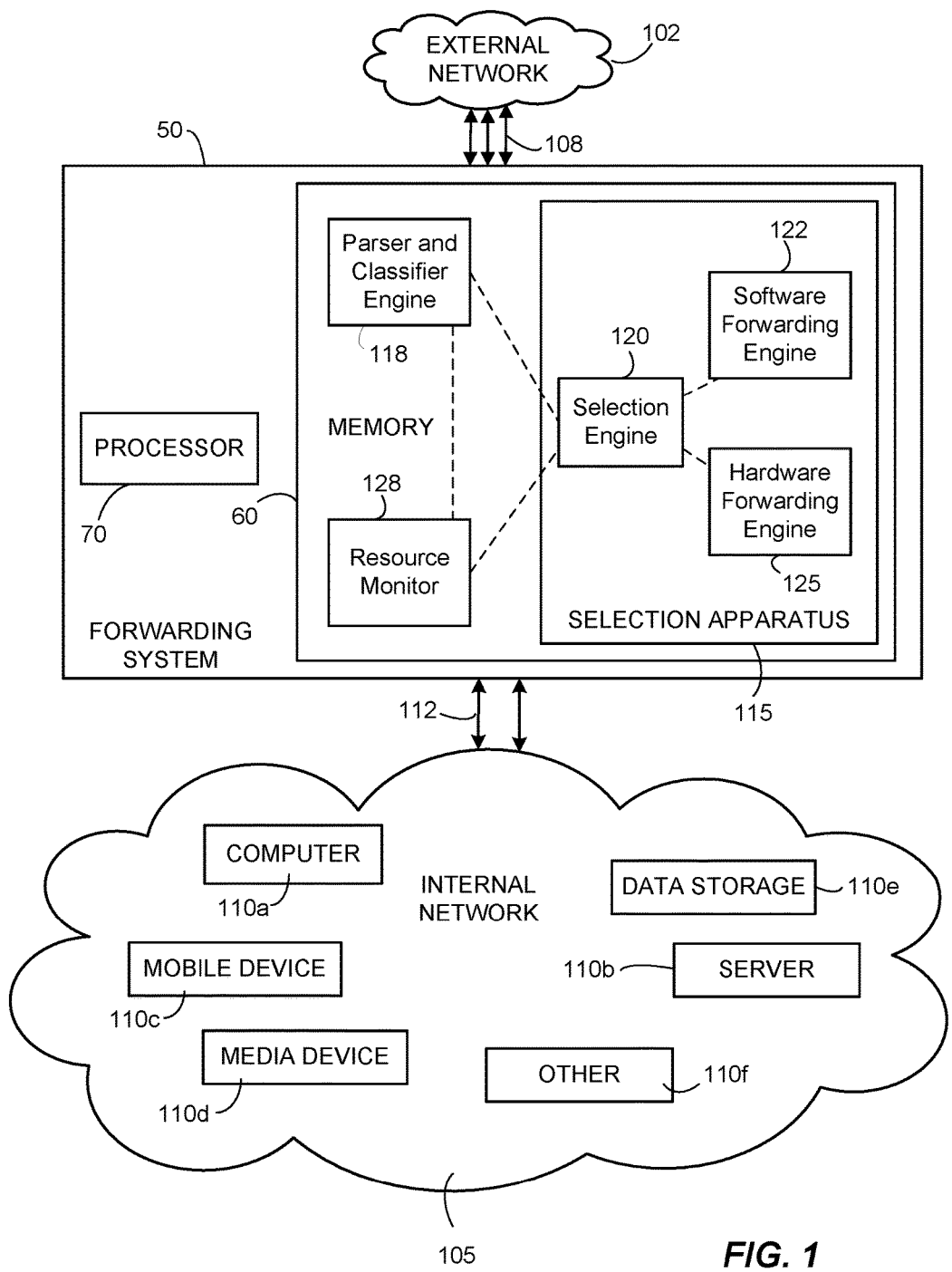
FIG. 1 is a block diagram of an example forwarding system connecting two or more networks, according to an embodiment of the disclosure herein.

FIG. 1 is a block diagram of an example forwarding system 50 connecting two or more networks, according to an embodiment of the disclosure herein. The forwarding system 50 is capable of efficiently and reliably forwarding traffic or data packets in an example arrangement between an external network 102 and an internal network 105. In some embodiments, the forwarding system 50 is also capable of forwarding traffic amongst devices in the internal network 105. The forwarding system 50 includes at least a switch/router for routing the data packets, and may include other functional equipment such as a modem or a wireless network access point. Typically, the forwarding system 50 includes a memory 60 storing computer readable or machine readable instructions and packet queues, and a processor 70 for executing the computer readable or machine readable instructions. Examples of forwarding systems 50 include routers, switches, home or residential gateways, small office, corporate or business gateways, and other types of communication equipment for handling multiple connections of streams or flows of data packets between networks. Unless otherwise indicated, the terms "forwarding system," "gateway," "packet processor," "packet processing system," and "router" are used interchangeably herein.

The forwarding system 50 connects an internal network 105 such as a Local Area Network (LAN) used within a home or small business to one or more external networks 102, for example, through an Internet service provider. Typically, the external network 102 is the Internet, however, the forwarding system 50 may alternatively or additionally provide connections to other external networks as well, such as a larger LAN or a Wide Area Network (WAN) used in a municipality or institutional campus. Generally, the forwarding system 50 includes a network interface with one or more network ports to communicate with the external network 102 via one or more links 108. The one or more links are any suitable communication links such as any currently known suitable communication or networking technology. Examples of links include cable television links, DSL (Digital Subscriber Line) links, fiber optic links, T1 links, Ethernet, satellite links, radio frequency (RF) links, Fast Ethernet/Gigabit Ethernet (FE/GE) links, passive optical network (PON) links, etc.

The forwarding system 50 also generally includes a network interface with one or more network ports to communicate with the internal network 105. The internal network 105 includes devices 110a-110f that are configured and enabled to communicate via a networking communication protocol, such as a local area network (LAN) protocol and/or a wireless LAN protocol. In one embodiment, the devices 110a-110f communicate with the forwarding system 50 via one or more links 112, and the forwarding system 50 also acts as a switch to implement a wired or wireless LAN. In other embodiments, the forwarding system 50 is coupled, via the one or more links 112, to a separate switch that implements the wired or wireless LAN. Examples of devices that are included in the internal network 105 include computing devices such as a computer 110a or a server 110b, and mobile devices 110c such as smart phones, laptops, tablets, and the like. Other examples of possible devices in the internal network 105 include media devices 110d such as television sets, movie projectors, sound systems and other audio/visual equipment. Further examples include data storage devices 110e such as hard discs, network storage devices, etc. Generally, other suitable devices 110f of the internal network 105 are in communication with and serviced by the forwarding system 50.

Network traffic serviced by the forwarding system 50 includes data packets originating from each of the devices 110a-110f and destined for the external network 102, and network traffic originating from the external network 102 and destined for one or more of the devices 110a-110f. In one embodiment, the forwarding system 50 also services data packets originating from devices 110a-110f and destined for one or more other devices 110a-110f in the internal network 105. The network traffic ingresses into and egresses out of the forwarding system 50 in data flows or streams. As used herein, the term "ingress," "ingressing," "incoming," "egress," "egressing," and "outgoing" are used from the perspective of the forwarding system 50. That is, ingress or incoming packets are packets that enter the forwarding system 50 (either from the internal network 105 or from the external network 102), and egress or outgoing packets are packets that exit the forwarding system 50 (either to the internal network 105 or to the external network 102). Also as used herein, the terms "flow," "data flow," "data stream," and "stream," "traffic," "traffic flow," "network traffic," and "network traffic flow" are used interchangeably to mean related packets of data sent by a device in one network and destined for another device in another network. As such, all packets of particular data flow have a same origin and a same destination, as well as a same quality of service (QoS) or priority requirement. For example, a flow can be a data stream corresponding to a downloaded file, a streaming video, a streaming audio, voice over Internet Protocol (VoIP), a sequence of chat room characters entered by a user, an email, an indication of a user selection on a web page, etc. Furthermore, for ease of discussion, the techniques described herein refer to flows that originate from the external network 102 and are destined for a target device 110a-110f in the internal network 105, although it is noted that the techniques described herein are equally applicable to flows that originate at a target device 110a-110f in the internal network 105 and are destined for the external network 102, or to flows that originate a target device 110a-110f in the internal network 105 and destined for another target device 110a-110f in the internal network 105.

Certain time-critical network traffic is assigned a relatively high priority, while other delay-tolerant traffic is assigned a lower priority. Examples of typical higher priority flows include streaming media streams such as IPTV (Internet Protocol Television) or movies, VoIP, and other types of applications that require essentially real-time processing. Examples of typical lower priority flows include applications such as web browsing, email, chat room messages, establishment of TCP (Transmission Control Protocol) sessions, establishment of PPPoE (Point-to-Point Protocol over Ethernet) connections, and other types of applications that do not require real-time processing or can tolerate some delay. In some situations, a priority of a flow is based on an agreed-upon throughput or quality of service for a customer.

In current forwarding systems (not shown), a given high priority flow or its data payload is typically serviced in its entirety using a dedicated hardware implementation such as an ASIC (Application-Specific Integrated Circuit) device, custom IC, etc. (herein referred to as "hardware forwarding"). Hardware forwarding occurs at wire speed and is typically much faster than forwarding by a processor implementing software instructions (herein interchangeably referred to as "software processing" or "software forwarding"). However, such dedicated hardware forwarding requires significant amounts of costly memory and is limited in its flexibility to service different types and complexities of data flows and applications. On the other hand, software forwarding provides greater flexibility than hardware forwarding, but is limited in performance and speed.

Referring again to FIG. 1, the forwarding system 50 load shares packet processing of multiple flows (and even within a single individual flow, at least in some embodiments and/or scenarios) between hardware and software forwarding to provide maximum system performance and flexibility. In particular, the forwarding system 50 includes a selection apparatus 115 that selects between hardware and software forwarding engines in the forwarding system 50 for load sharing purposes and for other purposes. In an embodiment, the selection apparatus 115 is coupled to a parser and classifier engine 118 that parses headers (and optionally other portions) of all incoming packets and identifies or classifies each incoming packet. In an exemplary embodiment, incoming packets are each identified or classified as corresponding to a respective flow, and in particular, as corresponding to a priority of the respective flow. In an embodiment, the parser and classifier engine 118 determines the flow and/or its respective priority based on information stored in a hardware memory location, such as in the memory 60. The parser and classifier engine 118 is implemented in hardware, in an embodiment. In an alternative embodiment, the parser and classifier engine 118 is implemented at least partially in software. A suitable parser and classifier engine 118 is described in co-pending U.S. patent application Ser. No. 12/947,678 filed on Nov. 16, 2010, the entire disclosure of which is hereby incorporated by reference herein.

The selection apparatus 115 includes a selection engine 120, in an embodiment. For a given ingressing packet, the selection engine 120 selects one of a software forwarding engine 122 or a hardware forwarding engine 125 to process the given packet based on the identification or classification of the packet as determined by the parser and classifier engine 118. In some embodiments, the selection engine 120 selects the software forwarding engine 122 or the hardware forwarding engine 125 further based on based on system resource availability, such as system load status, stream bandwidth, and other such resources. In these embodiments, the selection engine 120 receives information or one or more indications of system resource availability from a resource monitor 128. In an embodiment, the resource monitor 128 is implemented in hardware. In an alternative embodiment, at least a portion of the resource monitor 128 is implemented in software. Further, while FIG. 1 illustrates the resource monitor 128 as a distinct entity from the selection apparatus 115, in some embodiments (not shown), at least a portion of the resource monitor 128 is included in the selection apparatus 115.

In some embodiments, the selection engine 120 dynamically changes between selecting the software forwarding engine 122 and the hardware forwarding engine 125 for different packets of a same particular flow based on system load status, stream bandwidth, and other parameters indicated by the resource monitor 128 to enable maximum utilization of system capabilities. In some embodiments, the parser and classifier engine 118 determines classification of packets based on not only parsed information from the packet, but also based on the system load status, stream bandwidth, and other parameters indicated by the resource monitor 128. In some embodiments, at least some portion of the selection apparatus 115, such as the selection engine 120, includes computer readable or machine readable instructions stored on the memory 60 and executable by the processor 70. In some embodiments, at least some portion of the selection apparatus 115, is implemented in hardware.

Figure 2:
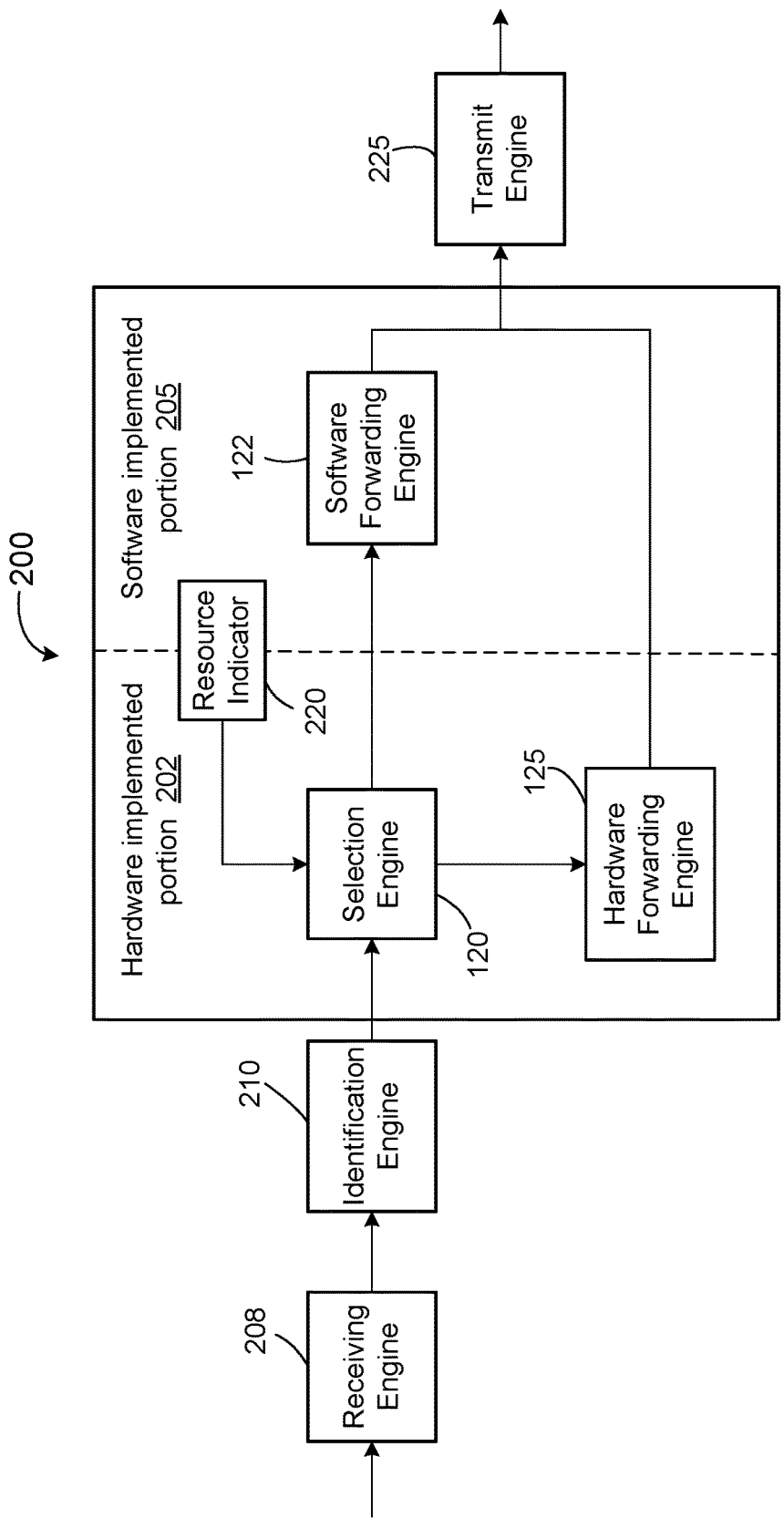
FIG. 2 is a block diagram of a selection apparatus, according to an embodiment.

FIG. 2 is a block diagram of a selection apparatus 200, according to an embodiment. In an embodiment, the selection apparatus 200 is included in the forwarding system 50 of FIG. 1 as shown by reference 115. In other embodiments, the selection apparatus 200 is included in other forwarding systems. For clarity of discussion, but not as a limitation, the description below refers to an embodiment in which the selection apparatus 200 is included in the forwarding system 50 of FIG. 1, and as such, includes references found in FIG. 1. Generally, in one scenario, the selection apparatus 200 receives ingress packets of a flow, stream or connection from the external network 102. While processing the ingress packets to forward to target devices 110a-110f, the apparatus 200 selects between software and hardware forwarding engines 122, 125 of the forwarding system 50 based on priorities of flows, quality of service, availability of various system resources or changes thereto, load sharing, and/or other criteria.

In one scenario, a receiving engine 208 of a forwarding system 50 receives ingress packets from the external network 102 using a network interface. The receiving engine 208 forwards the ingress packets to an identification engine 210. The identification engine 210 includes the parser and classification engine 118 of FIG. 1, in an embodiment. In some embodiments, the identification engine 210 is implemented in the hardware, but in other embodiments, the identification engine 210 is implemented at least partially using software.

The identification engine 210 parses the header and (optionally) other fields of the packet to identify and classify the packet and a particular flow to which the packet corresponds, in an embodiment. Thus, the identification engine 210 also acts as a classification engine. In some embodiments, the identification engine 210 assigns or otherwise determines or associates an identification (ID) to the flow and associates the ID with packets corresponding to the flow. In some embodiments, the identification engine 210 also determines an application, an application type, and/or a packet type corresponding to the packet. For example, at least some part of the identification engine 210 utilizes techniques described in previously mentioned U.S. patent application Ser. No. 12/947,678. Generally, the information determined by the identification engine 210 is stored in a packet descriptor corresponding to the packet. The packet descriptor is internally used by the forwarding system 50 to refer to and store information pertaining to the packet. In an embodiment, the identification engine or classifier 210 includes statistics counters for each stream, which are used by the selection engine 120 to load balance between the hardware and software forwarding engines 122, 125 (e.g., low bandwidth streams can be forwarded by the software forwarding engine 122 and high bandwidth streams can be forwarded by the hardware forwarding engine 125).

An "application corresponding to a flow," as used herein, refers to an application that is typically resident and executing on a target device 110a-110f in the internal network 105 and is a final destination of a particular flow. Accordingly, the "application corresponding to a flow" processes or operates on the content or data payload of packets in the particular flow. For example, for a flow whose packet payloads include a downloaded file, a corresponding application is a web browser, an email application, a word processing application, etc., at a computer 110a from which the file download was requested. In another example, for a data flow whose payload includes streaming video, a corresponding application at a mobile device 110c is a video player.

Applications are typed or grouped by characteristics, in an embodiment. For example, in one embodiment, applications of one type have one level of desired real-time streaming speed, and applications of another type tolerate a slightly different real-time streaming requirement. In another example, applications are typed by protocol, where applications on top of a TCP session are assigned one type and applications on top of a PPPoE session are assigned a different type, in an embodiment. In yet another example, applications are typed by category, so that all gaming applications are of one type, all streaming media applications are of another type, and all web site surfing applications are of yet another type, in an embodiment. Of course, in other embodiments, other suitable ways of typing or grouping applications are utilized.

The forwarding system 50 (FIG. 1) processes ingress packets based on policies or rules, in an embodiment. The policies or rules are based on the application and/or the application type, in an embodiment. In other embodiments, the policies or rules are based additionally or alternatively on a target device or user, on the flow ID, on availability or changes in availability of system resources, etc. In an embodiment, the identification engine 210 associates the flow ID with the packet, such as in the packet descriptor, by appending the flow ID to the packet, etc.

Turning back to FIG. 2, the selection apparatus 200 includes a hardware-implemented portion 202 and a software-implemented portion 205, in an embodiment. The software-implemented portion 205 corresponds to computer-executable instructions that are stored on a memory and executed by a processor such as a CPU, and the hardware-implemented portion 202 corresponds to one or more integrated circuits (ICs), in an embodiment, although other software and hardware implementations are possible. In one embodiment, the processor that implements the software-implemented portion 205 is on a separate IC from the hardware-implemented portion 202. In another embodiment, the processor that implements the software-implemented portion 205 and at least a portion of the hardware-implemented portion 202 are implemented on a single IC.

The identification engine 210 forwards the ingress packet to a selection engine 120 in the selection apparatus 200. Although the embodiment of the selection apparatus 200 shown in FIG. 2 illustrates the selection engine 120 as being entirely implemented in the hardware-implemented portion 202 of the selection apparatus 200, in some embodiments, the selection engine 120 is entirely implemented in the software-implemented portion 205. Alternatively, in some embodiments, the selection engine 120 is implemented partly in both the hardware-implemented portion 202 and the software-implemented portion 205.

The selection engine 120 selects either a software forwarding engine 122 or a hardware forwarding engine 125 for use in processing the packet. The selection engine 120 bases its selection on one or more classifications determined by the identification engine 120, such as a priority of a flow corresponding to the packet, a quality of service, a type of processing (e.g., by layer 2 or by layer 3), or other suitable factor. In some embodiments, the selection engine 120 additionally or alternatively bases its selection on an indication of an availability of one or more resources as indicated by the resource indicator 220. In some embodiments, the resource indicator 220 determines indications of resource usage and/or availability based on information from the resource monitor 128 of FIG. 1.

The resource indicator 220 provides indications of current usage or availability levels of one or more software resources, one or more hardware resources, or both software and hardware resources. Software resources include one or more of, for example, processor bandwidth, processor bandwidth per flow, a number of other suitable types of resources allocated for processing by an operating system, etc., in some embodiments. Hardware resources include one or more of, for example, ternary content addressable memory (TCAM) rows, a size of a TCAM, a number of available entries in the TCAM, a number of queues or buffers in which packets are held while awaiting forwarding to a target device, a size of a queue or buffer, a number of entries in a queue or buffer, etc., in some embodiments.

In the embodiment illustrated in FIG. 2, the resource indicator 220 provides both software and hardware resource usage indications, as shown by its location straddling both the software portion 205 and the hardware portion 202 of the selection apparatus 200. In one embodiment, the resource indicator 220 is partially hardware-implemented and partially software-implemented. In another embodiment, the resource indicator 220 is entirely software-implemented, and in another embodiment, the resource indicator 220 is entirely hardware-implemented.

Based on one or more indications provided by the resource indicator 220 and/or the flow ID and/or other information generated by the identification engine 210 such as packet type, application type, etc., the selection engine 120 selects either the software forwarding engine 122 or the hardware forwarding engine 125 to handle the forwarding of the ingress packet. The selected forwarding engine 122 or 125 processes the ingress packet and forwards the ingress packet to a transmit engine 225 for egress from the forwarding system 50 to the appropriate target device 110a-110f. For a subsequent, next or later ingress packet of the same flow, the selection engine 120 re-selects, based on updated resource indications 220 and/or information generated by the identification engine 210, either the software forwarding engine 122 or the hardware forwarding engine 125 to handle the forwarding of the subsequent, next or later ingress packet. Thus, the forwarding of various packets within a same flow (and, in particular, the forwarding of various data payload packets within a same flow) need not be exclusively handled by the software forwarding engine 122 or exclusively handled by the hardware engine 125, at least in some embodiments. Instead, in at least some embodiments, the processing of various packets within a same flow is based on resource availability or usage so that loads are shared between the software forwarding engine 122 and the hardware forwarding engine 125. For example, for a particular flow, a first portion of the flow is processed by the software forwarding engine 122, a second portion is processed by the hardware forwarding engine 125, and yet a third portion is processed by the software forwarding engine 122. In this manner, both software and hardware resources are systemically shared to handle traffic throughput in the forwarding system 50, and the forwarding engine selection is dynamically adjusted to handle changing conditions and to optimize system resource utilization. In other embodiments, information generated by the identification engine 210 is also utilized by the selection engine 120 to select either the software forwarding engine 122 or the hardware forwarding engine 125 to handle the forwarding of the ingress packet.

In some embodiments, a level of resource utilization for one or more resources is selectable. For example, a maximum desired processor load for processing network traffic (as compared to other processing responsibilities of the processor) is selected or indicated, by an operator or automatically, for example, and is used by the selection engine 120 to determine a desired forwarding engine. If it is later determined that the selected maximum processor load should be changed, the maximum processor load is manually or automatically adjusted, and the selection engine 120 makes its new forwarding decisions accordingly. Similarly, levels of resource utilization are selectable for other software resources and/or for hardware resources, in some embodiments.

Consider a scenario where several relatively high priority flows are being forwarded by using the hardware forwarding engine 125 in the forwarding system 50. For example, the hardware forwarding engine 125 includes a TCAM, in an embodiment, and utilizes the TCAM to make forwarding decisions. A number of rows or entries in the TCAM, however, is fixed. If a new flow is received at the forwarding engine 50 (for example, when a user splits IPTV screens or when multiple devices within the internal network 105 surf the web), the selection engine 120 determines, based on input from the resource indicator 220, that there are no more available entries in the TCAM to accommodate the new flow or that the TCAM is near capacity (e.g., the number of available entries is below a threshold), in an embodiment. The selection engine 120 also determines, based on input from the resource indicator 220, that the processor of the forwarding system 50 is relatively unloaded, in some embodiments. The selection engine 120 then re-selects the software forwarding engine 122 to service a flow currently being serviced by the hardware forwarding engine 125 but of a lower priority than the new flow, and selects the hardware forwarding engine 125 to service the new flow using the freed TCAM resource.

In another scenario, during the operation of the forwarding system 50, the processor is required to perform a processor-intensive activity such as a system audit. The selection engine 120 receives an indication from the resource indicator 220 that available processor bandwidth for servicing flows is decreasing. The selection engine 120, though, may determine via the resource indicator 220 that hardware bandwidth is presently underutilized. For subsequent packets of a flow that is currently handled by the software forwarding engine 122, the selection engine 120 re-selects the hardware forwarding engine 125 and re-directs subsequent ingress packets of the flow to the hardware forwarding engine 125 for processing. After the processor-intensive activity has finished and the resource indicator 220 indicates as such, the selection engine 120 then re-selects the software forwarding engine 122, and further ingress packets of the flow return to being processed by the software forwarding engine 122.

In some embodiments, in addition to or instead of the selection engine 120 basing its selection on resource availability, the selection engine 120 selects the forwarding engine based on the application corresponding to the flow. In an example, the selection engine 120 selects the hardware forwarding engine 125 to process multicast packets, and selects the software forwarding engine 122 to process OEM (Original Equipment Manufacturer) related messages. In another scenario, different types of packets for a particular application are processed by different forwarding engines. For example, when a flow corresponds to a media streaming session, packets associated with the initial set up of the media streaming session are forwarded to the software forwarding engine 122 as they are less real-time critical, and packets carrying media (e.g., audio, video, etc.) data are forwarded to the hardware forwarding engine 125 for faster processing. In yet another example, a particular application corresponding to another flow is required or desired to be immune to potential processor failures or interrupts (e.g., a VoIP session), and thus those packets are directed to the hardware forwarding engine 125 to meet the application's requirement. Thus, the selection engine 120 selects a forwarding engine to service a particular flow entirely or to service particular packets within a flow based on a type of application (e.g., real-time intensive or not), a type of packet corresponding to the application (e.g., administrative packet, payload packet, or other), or a requirement of the application itself (e.g., degree of immunity to processor failures, interrupts, complexity or flexibility of processing logic, etc.). Other criteria of selection are also possible.

Figure 3:
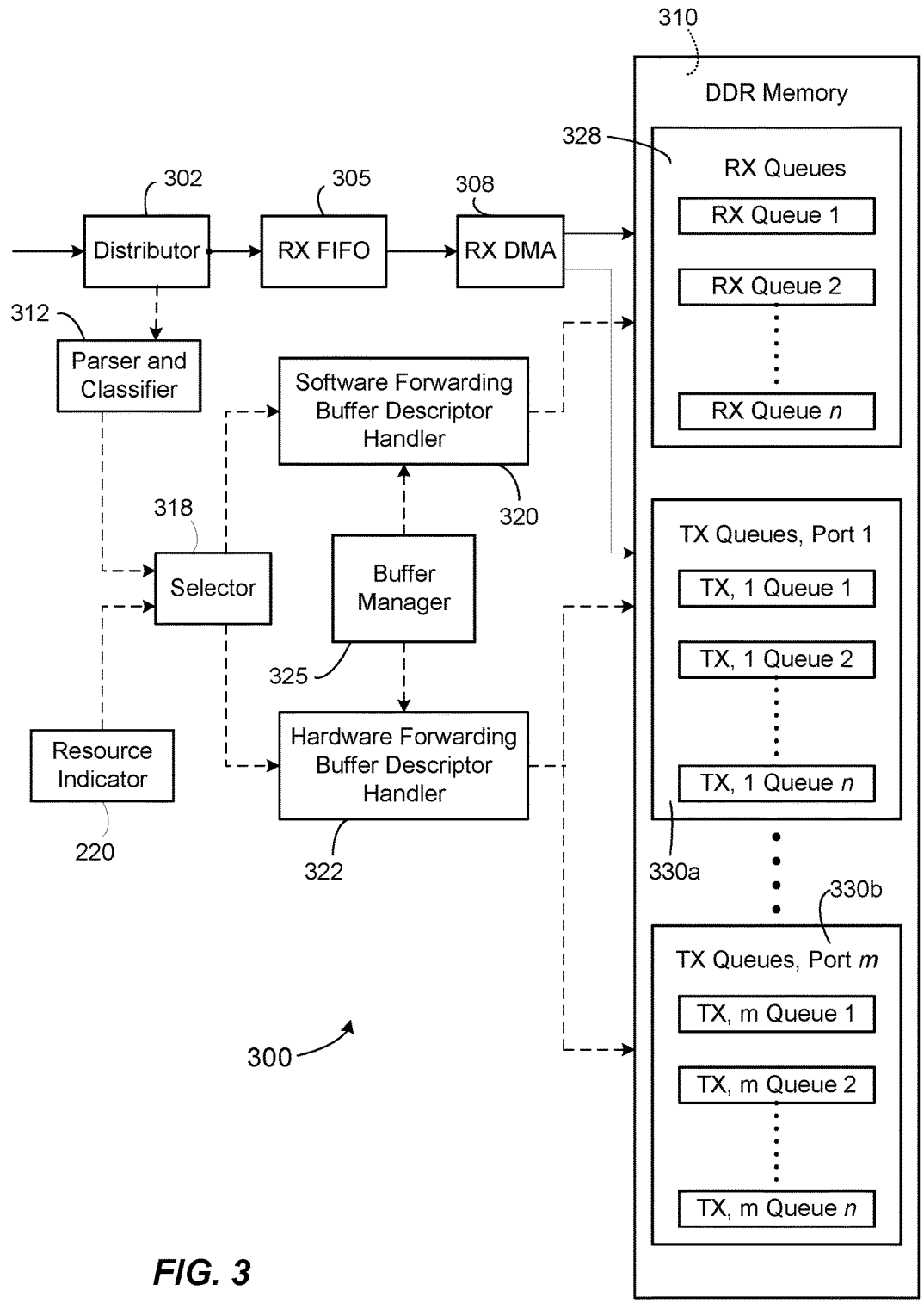
FIG. 3 is a block diagram of an ingress pipeline of a forwarding system, according to an embodiment of the disclosure herein.

FIG. 3 is a block diagram of an ingress pipeline 300 of a forwarding system, according to an embodiment of the disclosure herein. The ingress pipeline 300 operates in conjunction with the system 50 of FIG. 1 and/or the selection apparatus 200 of FIG. 2, in an embodiment. In other embodiments, the ingress pipeline 300 operates in conjunction with a forwarding system different than the system 50 of FIG. 1 and/or the selection apparatus 200 of FIG. 2. For clarity purposes, but not for limitation purposes, FIG. 3 is described in conjunction with references to FIGS. 1 and 2.

The ingress pipeline 300 of the forwarding system receives and processes ingress packets for forwarding to a target device. In particular, an ingress packet is received from a network interface at a distributor block 302 that forwards various portions of the ingress packet to be processed along different paths of the ingress pipeline 300. The distributor 302 processes the packet via a first path to be written to memory, and processes an administrative portion (e.g., a header) corresponding to the packet via a second path to determine a corresponding target destination device and to queue the packet for egress or transmission. In FIG. 3, the first path corresponding to the ingress packet itself is denoted by solid arrows, and the second path corresponding to the administrative or non-payload portions corresponding to the ingress packet is denoted by dashed arrows.

In particular, the packet is received by a Receive (Rx) First-In-First-Out (FIFO) block 305 for queuing and forwarding to a Rx Direct Memory Access (DMA) block 308. The DMA block 308 copies or writes the packet into a memory 310. In an embodiment, the memory 310 is an external DDR (Double Data Rate) memory. In other embodiments, the memory 310 is another type of suitable memory.

The distributor 302 forwards the header of the packet to a parser and classifier block 312. In some embodiments, the distributor block 302 and at least a portion of the parser and classifier block 312 are both included in the receiving engine 208 of FIG. 2. In the same or other embodiments, at least a portion of the parser and classifier block 312 is included in the identification engine 210 of FIG. 2. For example, the parser and classifier block 312 are implemented in the hardware-implemented portion 202 of the forwarding system 50, in an embodiment. In an alternative embodiment, the parser and classifier block 312 are partially or entirely implemented in the software-implemented portion 205 of the forwarding system 50. In one embodiment, entries corresponding to the presence of different flows are stored in a TCAM, and at least some rules or policies corresponding to the different flows are stored and accessed using the TCAM.

The parser and classifier block 312 parses and classifies the header of the packet to determine a flow identification, a priority of the flow, etc. The parser and classifier block 312 determines, for example, if the flow corresponding to the ingressing packet is an existing flow or is a new flow known to the forwarding system 50. If the ingressing packet corresponds to an existing flow, the parser and classifier block 312 assigns a unique flow identifier (ID) corresponding to the flow. In some embodiments, the parser and classifier block 312 also determines an application corresponding to the packet or flow, a type of application corresponding to the packet or flow, and/or a type of packet in the flow (e.g., administrative, payload, etc.). Information determined by the parser and classifier 312 is included in a packet descriptor, in an embodiment.

A selector block 318 receives information from the parser and classifier block 312 (e.g., by accessing the packet descriptor) and from the resource indicator 220. Based on at least one of these inputs, the selector block 318 selects a forwarding engine—either software 122 or hardware 125—to service the ingress packet. The selector block 318 bases its selection on at least one of a priority of the packet, the application corresponding to the flow of the packet, the application type, an application requirement, a packet type, a current level of an availability or a load of one or more software resources, and/or a current level of availability or a load of one of more hardware resources, such as in a manner as previously discussed with respect to FIG. 2.

If a software forwarding engine 122 is selected by the block 318, the packet descriptor of the ingress packet is forwarded to a software forwarding buffer descriptor handler 320 included in the software forwarding engine 122. Similarly, if a hardware forwarding engine 125 is selected by the selector block 318, the packet descriptor of the ingress packet is forwarded to a hardware forwarding buffer descriptor handler 322 included in the hardware forwarding engine 125. The selected descriptor handler (e.g., either reference 320 or 322) is allocated and/or receives an indication of a buffer from a buffer manager 325, and the selected descriptor handler associates the packet descriptor with the buffer to identify the ingressing packet during the processing and queuing of the descriptor and during preparation for egress from the forwarding system 50. A suitable buffer manager 325 is described in co-pending U.S. patent application Ser. No. 13/038,266, which is filed concurrently with the present application, is claims priority to U.S. Provisional Application No. 61/347,947 filed May 25, 2010, and claims priority to U.S. Provisional Application No. 61/615,327 filed Mar. 18, 2010; and the entire disclosure of which is hereby incorporated by reference herein.

If the ingress packet descriptor is processed by the software forwarding buffer descriptor handler 320, an indication of the buffer (referred to herein as a "buffer descriptor") in which the packet is stored is itself stored in a packet descriptor, and the packet descriptor is stored in the one Rx queue 328 to await transmission. In one embodiment, the buffer descriptor includes the buffer memory address in the memory 310 at which the ingressing packet was written, the buffer descriptor is written into the packet descriptor, and the packet descriptor is written into the selected Rx queue. The Rx queues 328 are administrated by the processor, in an embodiment, and each Rx queue corresponds to one or more of an ingress port, a priority corresponding to the packet or flow, an application corresponding to the packet or flow, a packet type, etc.

The software forwarding engine 122 processes packet descriptors stored in the Rx queues 328. For each packet descriptor, the software forwarding engine 122 analyzes the packet descriptor and determines an egress port to which the packet is to be forwarded. Once the egress port is determined, the software forwarding engine 122 stores the packet descriptor into a Tx (Transmit) queue corresponding to the determined egress port, i.e., one of n×m Tx (Transmit) queues 330, where m is a total number of egress ports of the forwarding system 50. In one embodiment, n queues correspond to each egress port, and each of the n Tx queues corresponds to one or more of a priority corresponding to the packet or flow, an application corresponding to the packet or flow, a packet type, etc. Embodiments of packet egress from the forwarding system 50 are more fully described with respect to FIG. 4.

If the ingress packet descriptor is processed by the hardware forwarding buffer descriptor handler 322, the hardware forwarding buffer descriptor handler 322 stores, in a packet descriptor, an indication of the buffer (i.e., a buffer descriptor) in which the packet is itself stored. Additionally, the hardware forwarding and buffer descriptor handler 322 analyzes the packet descriptor and determines an egress port to which the packet is to be forwarded. Once the egress port is determined, the hardware forwarding and buffer descriptor handler 322 stores the packet descriptor into a Tx queue corresponding to the determined egress port, i.e., one of n×m Tx (Transmit) queues 330, to await scheduling for transmission, where m is a total number of egress ports of the forwarding system 50. In an embodiment, the hardware forwarding buffer descriptor handler 322 uses Weighted Tail Drop (WTD) to select the one Tx queue to mitigate congestion. In one embodiment, the buffer descriptor includes the buffer memory address in the memory 310 at which the ingressing packet was written, the buffer descriptor is written into the packet descriptor, and the packet descriptor is written into the selected Tx queue. The Tx queues 330 are administrated in hardware, in an embodiment, and each Tx queue corresponds to one of in egress ports and to one or more of a priority corresponding to the packet or flow, an application corresponding to the packet or flow, a packet type, etc.

Figure 4:
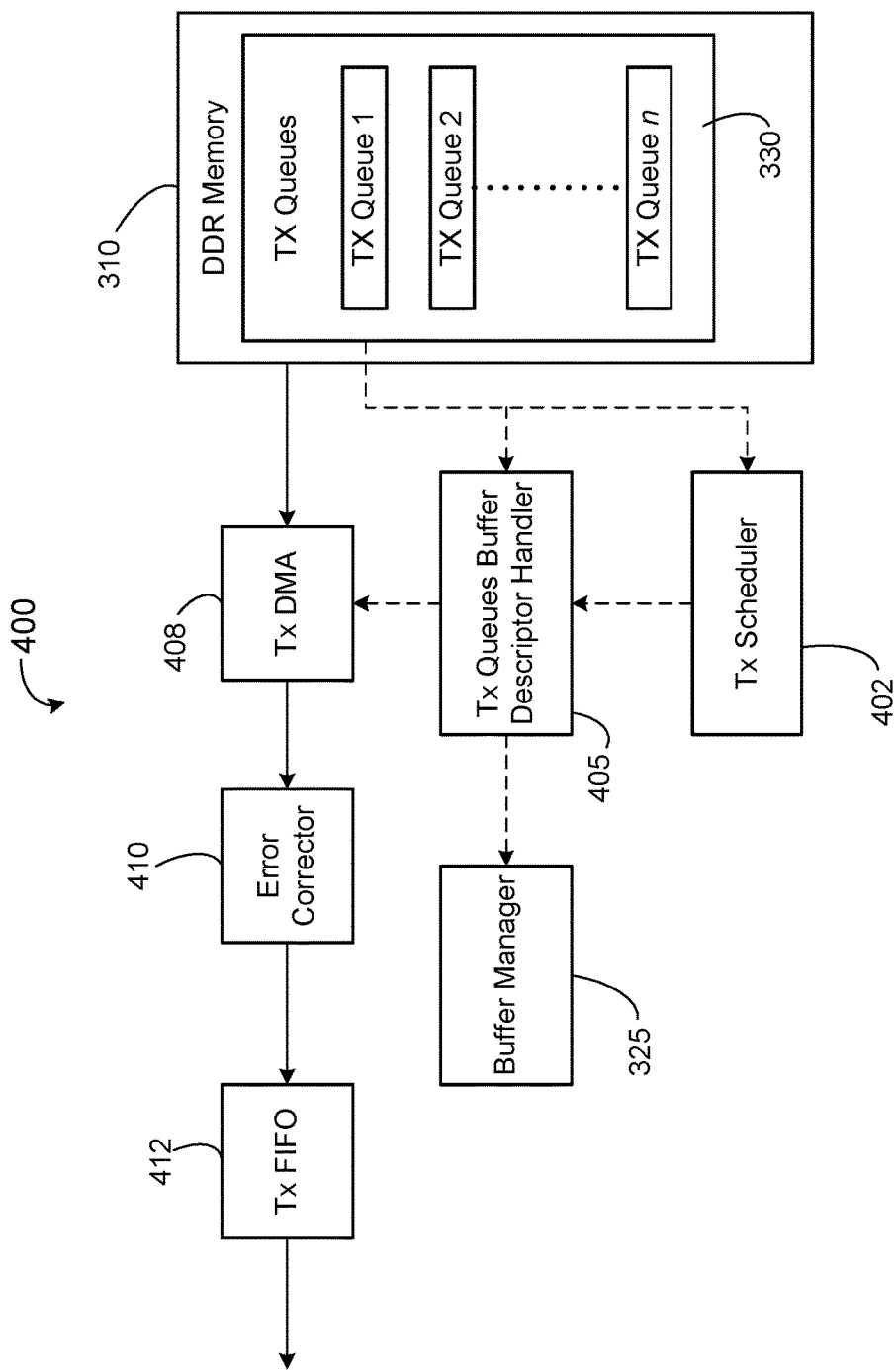
FIG. 4 is a block diagram of an egress pipeline of a forwarding system, according to an embodiment of the disclosure herein.

FIG. 4 is a block diagram of an egress pipeline 400 of a forwarding system, according to an embodiment of the disclosure herein. The egress pipeline 400 operates in conjunction with the system 50 of FIG. 1, the selection apparatus 200 of FIG. 2, and/or the ingress pipeline 300 of FIG. 3, in some embodiments. In other embodiments, the egress pipeline 400 operates in conjunction with a system different than the system 50 of FIG. 1, a selection apparatus different than the selection apparatus 200 of FIG. 2, and/or a pipeline different than the ingress pipeline 300 of FIG. 3. For clarity purposes, but not for limitation purposes, FIG. 4 is described in conjunction with references in FIGS. 1, 2 and 3. Similar to FIG. 3, the path corresponding to the ingress packet is denoted by solid arrows, and the path corresponding to the administrative or non-payload portions corresponding to the ingress packet is denoted by dashed arrows.

The egress pipeline 400 of the forwarding system processes packets from the ingress pipeline 300 and causes the packets to be forwarded or egressed from the forwarding system 50. In particular, a plurality of n Tx queues 330 each include one or more queued packet descriptors corresponding to packets awaiting transmission. A Tx scheduler 402 selects a next Tx queue from the set of Tx queues 330. An indication of the selected Tx queue is communicated to a Tx queues buffer descriptor handler 405, and the Tx queues buffer descriptor handler 405 draws or reads a next packet descriptor from the selected Tx queue 330. The drawn packet descriptor includes an indicator of a particular buffer memory location in the memory 310 at which the packet data is written. Based on the indicator of the particular buffer memory location provided by the Tx queues buffer descriptor handler 405, a Tx DMA 408 reads the packet data from the memory 310. In an embodiment and in some scenarios, the original, ingress header of the packet is modified to support egress from the system 50. In another embodiment and in some scenarios, the packet is modified by appending a newly generated header. Optional error correction and/or error detection such as a checksum or other error correction/detection is performed and added to the transmitted modified packet by a block 410, in an embodiment, and the packet is queued in a Tx FIFO 412 to await egress from the forwarding system 50 via a network interface. The buffer associated with the Tx FIFO-queued packet is released to the buffer manager 325 so that the released buffer is available for storing a subsequent packet. In some embodiments, some or all of the blocks 402-412 of the egress pipeline 400 are included in the transmit engine 225 of FIG. 2.

Figure 5:
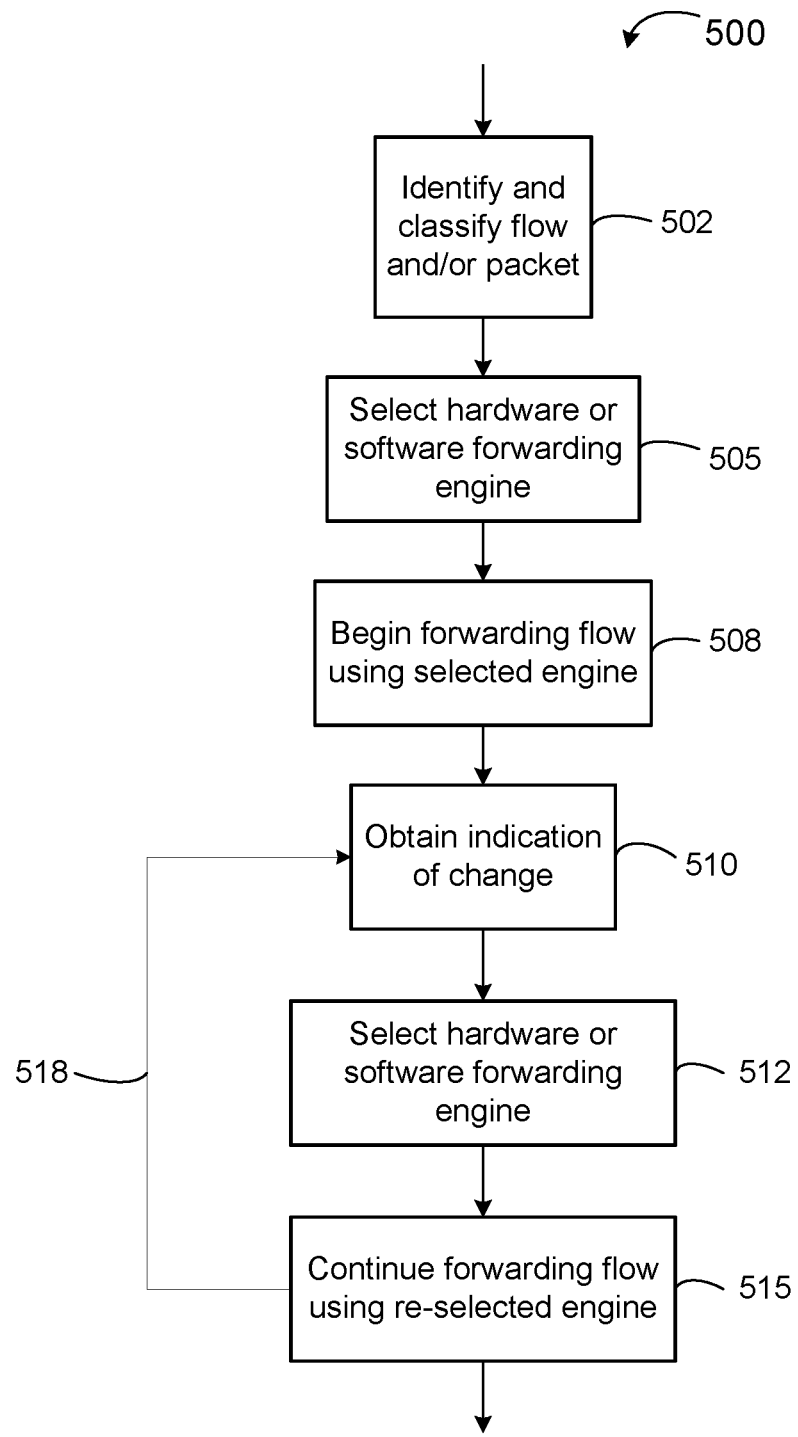
FIG. 5 is a flow diagram of an example method for combining hardware and software forwarding of network traffic in a forwarding system or gateway, according to an embodiment.

FIG. 5 is a flow diagram of an example method 500 for utilizing hardware and software forwarding of network traffic in a forwarding system or gateway, according to an embodiment. The method 500 operates in conjunction with the systems and apparatuses described with respect to FIG. 1, FIG. 2, FIG. 3 and/or FIG. 4, or in conjunction with other suitable forwarding systems and/or selection apparatuses.

At block 502, a packet received at a forwarding system or gateway 50 is parsed and classified. In some embodiments, classifying the packet includes one or more of: identifying a flow to which the packet corresponds, determining an application or type of application corresponding to the flow and/or the packet, determining a type of packet, determining a priority of the flow, etc.

At block 505, either a hardware forwarding engine or a software forwarding engine is selected. The forwarding engine is selected based at least on the information obtained from block 502. For example, in some embodiments, the forwarding engine is selected based on one or more of the flow to which the packet corresponds, an application corresponding to the flow or packet (e.g., video streaming, VoIP, administrative, gaming, etc.), a type of the application (e.g., real-time critical, not real-time critical, particular quality of service, etc.), a performance, resource or availability requirement of the application or the type of application, a type of packet, a priority of the flow, etc. In one embodiment, the forwarding engine is selected additionally or alternatively based on a current level of availability and/or load of one or more hardware resources, one or more software resources, or some combination of the two. At block 508, the packet is processed using the selected forwarding engine. In one embodiment, subsequent packets in the same flow are processed using the same selected forwarding engine.

At block 510, an indication of a change is obtained. The indication of change is a change to at least one hardware or software resource level of availability or load, in an embodiment. The indication of change is additionally or alternatively a change to a type of packet in the flow, in the same or a different embodiment. Indications of other suitable changes are alternatively or additionally obtained at block 510 in other embodiments.

Based on and in response to the obtained indication(s), at block 512 either the hardware forwarding engine or the software forwarding engine is selected, and at block 515, a subsequent packet or packets of the flow are processed through the forwarding system 50 using the forwarding engine that was re-selected at block 512. For example, if block 510 indicates a decrease in a level of availability below a threshold level hardware resource, at block 512 the software forwarding engine is selected based on the decrease in the hardware resource in an embodiment, and subsequent packets are forwarded to a target device using the software forwarding engine. In another example, if block 510 indicates a change in packet type (e.g., a type of a first packet is administrative and a type of a second packet is video data), at block 512 the hardware forwarding engine is selected at the block 512 based on the change in packet type, and the second packet is forwarded to the target device using the hardware forwarding engine.

If another change occurs during the forwarding of subsequent packets of the flow, the method 500 returns to block 510 (as denoted by the arrow 518) to respond to the change.

It should be noted that while the discussion of packet processing with regard to FIGS. 1-5 was in the context of packets that are ingressed from the external network 102, the techniques, systems, apparatuses and methods disclosed herein are equally applicable to processing packets that are ingressed from the internal network 105, or to packets that originate from and terminate at devices within the internal network 105. Further, while embodiments of forwarding techniques, systems, apparatuses and methods are described herein in the context of Ethernet networks, one of ordinary skill in the art will recognize, in light of the disclosure and teachings herein, that similar methods and apparatus are suitable for use in other suitable communication networks as well.

As previously discussed, at least some of the various blocks, operations, and techniques described above may be implemented in hardware, a processor executing firmware and/or software instructions, or any combination thereof. When implemented in firmware and/or software, the firmware and/or software instructions may be stored in any computer readable or machine readable memory such as on a magnetic disk, an optical disk, or other tangible storage medium, in a RAM or ROM or flash memory, processor, hard disk drive, optical disk drive, tape drive, etc. The software or firmware instructions may include computer readable or machine readable instructions stored on a memory of one or more computer readable or machine readable storage media that, when executed by the processor, cause the processor to perform various acts. When implemented in hardware, the hardware may comprise one or more of discrete components, an integrated circuit, an application-specific integrated circuit, etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for forwarding network traffic in a network device, the method comprising:

receiving a packet at the network device, the network device having (i) a software forwarding engine, and (ii) a hardware forwarding engine, wherein the software forwarding engine and the hardware forwarding engine are configured to determine egress ports of the network device via which received packets are to be transmitted along towards forwarding destinations, and wherein the software forwarding engine is implemented using a processor executing machine readable instructions;

analyzing, at the network device, a header of the received packet to determine i) whether the received packet belongs to any flows of packets already known to the network device, and ii) a packet type of the received packet, including determining whether the received packet is an administrative-type packet or a payload-type packet;

selecting, at the network device, one of the software forwarding engine or the hardware forwarding engine to process the received packet based on i) whether the received packet belongs to any flows of packets already known to the network device, and ii) the determined packet type, including
   when it is determined that the received packet does not belong to any flow of packets already known to the network device, selecting the software forwarding engine, and
   when it is determined that the received packet belongs to one of the flows of packets already known to the network device, selecting one of the software forwarding engine or the hardware forwarding engine based at least in part on i) the one of the flows of packets already known to the network device and ii) the determination of whether the received packet is the administrative-type packet or the payload-type packet; and
processing and forwarding, by the network device, the received packet using only the selected one of the software forwarding engine or the hardware forwarding engine and without using the unselected one of the software forwarding engine and the hardware forwarding engine.

2. The method of claim 1, wherein:
the received packet is a first packet;
the first packet is of a stream of packets corresponding to a session;
the first packet is associated with an initial set up of the session;
the software forwarding engine is selected to process the first packet based on determining that the first packet is the administrative-type packet;
the first packet is processed and forwarded using only the software forwarding engine and without using the hardware forwarding engine; and
the method further comprises:
   receiving a second packet at the network device,
   determining, at the network device, that the second packet is the payload-type packet of the stream of packets corresponding to the session, and
   selecting, at the network device, the hardware forwarding engine to process the second packet based on determining that the second packet is the payload-type, and
   processing and forwarding, by the network device, the second packet using only the hardware forwarding engine and without using the software forwarding engine.

3. The method of claim 1, wherein:
different packet types correspond to different levels of required processing speed; and
selecting one of the software forwarding engine or the hardware forwarding engine to process the received packet is further based on a level of required processing speed corresponding to the determined packet type of the received packet.

4. The method of claim 1, further comprising:
determining, at the network device, a type of processing required to be performed on the received packet;
wherein selecting one of the software forwarding engine or the hardware forwarding engine to process the received packet is further based on the determined type of processing required to be performed on the received packet.

5. The method of claim 4, wherein:
determining the type of processing required to be performed on the received packet includes determining whether layer-2 processing is required and determining whether layer-3 processing is required; and
selecting one of the software forwarding engine or the hardware forwarding engine to process the received packet further based on whether layer-2 processing is required and whether layer-3 processing is required.

6. The method of claim 1, further comprising, when the received packet belongs to a known flow of packets:
determining, at the network device, an identifier of the flow to which the received packet belongs;
wherein selecting one of the software forwarding engine or the hardware forwarding engine to process the received packet is further based on the identifier of the flow to which the received packet belongs.

7. The method of claim 1, further comprising:
determining, at the network device, a type of application corresponding to the received packet;
wherein selecting one of the software forwarding engine or the hardware forwarding engine to process the received packet is further based on the determined type of application corresponding to the received packet.

8. The method of claim 1, further comprising:
determining, at the network device, at least one of i) a processing load of the software forwarding engine, and/or ii) a processing load of the hardware forwarding engine;
wherein selecting the one of the software forwarding engine or the hardware forwarding engine includes using at least one of i) the processing load of the software forwarding engine, and/or ii) the processing load of the hardware forwarding engine to select the one of the software forwarding engine or the hardware forwarding engine.

9. The method of claim 8, wherein determining at least one of i) the processing load of the software forwarding engine, and/or ii) the processing load of the hardware forwarding engine comprises determining a level of utilization of a ternary content addressable memory (TCAM) utilized by the hardware forwarding engine;
wherein selecting the one of the software forwarding engine or the hardware forwarding engine includes using the level of utilization of the TCAM to select the one of the software forwarding engine or the hardware forwarding engine.

10. A network device, comprising:
one or more integrated circuits including:
   a processor;
   a memory coupled to the processor, the memory storing machine readable instructions that, when executed by the processor, cause the processor to implement a software forwarding engine configured to select, using the machine readable instructions, egress ports for transmitting packets from the network device;
   a hardware forwarding engine configured to select egress ports for transmitting packets from the network device;
   a classification engine configured to determine whether a received packet belongs to a known flow of packets, and determine a packet type of the received packet, including determining whether the received packet is an administrative-type packet or a payload-type packet; and
   a selection engine configured to select one of the software forwarding engine or the hardware forwarding engine based on i) whether the received packet belongs to any flows of packets already known to the network device, and ii) the determined packet type, wherein the selection engine is further configured to when it is determined that the received packet does not belong to a known flow of packets, select the software forwarding engine, and when it is determined that the received packet belongs to one of the flows of packets already known to the network device, selecting one of the software forwarding engine or the hardware forwarding engine based at least in part on i) the one of the flows of packets already known to the network device and ii) the determination of whether the received packet is the administrative-type packet or the payload-type packet; and wherein the one or more integrated circuits are configured to process the received packet and to forward the received packet to a selected egress port using only the selected one of the software forwarding engine or the hardware forwarding engine and without using the unselected one of the software forwarding engine and the hardware forwarding engine.

11. The network device of claim 10, wherein:
the received packet is a first packet;
the first packet is of a stream of packets corresponding to a session;
the first packet is associated with an initial set up of the session;
the classification engine is configured to determine that a second packet received by the network device is the payload-type packet of the stream of packets corresponding to the session; and
the selection engine is configured to:
select the software forwarding to process the first packet based on determining that the first packet is the administrative-type packet, and
select the hardware forwarding engine to process the second packet based on determining that the second packet is the payload-type.

12. The network device of claim 10, wherein:
different packet types correspond to different levels of required processing speed; and
the selection engine is configured to select one of the software forwarding engine or the hardware forwarding engine to process the received packet further based on a level of required processing speed corresponding to the determined packet type of the received packet.

13. The network device of claim 10, wherein:
the selection engine is configured to select one of the software forwarding engine or the hardware forwarding engine to process the received packet further based on a determined type of processing required to be performed on the received packet.

14. The network device of claim 13, wherein:
the selection engine is configured to select one of the software forwarding engine or the hardware forwarding engine to process the received packet further based on whether layer-2 processing is required and whether layer-3 processing is required.

15. The network device of claim 10, wherein:
the classification engine is configured to determine an identifier of the flow to which the received packet belongs when the received packet belongs to a known flow; and
the selection engine is configured to select one of the software forwarding engine or the hardware forwarding engine to process the received packet further based on the identifier of the flow to which the received packet belongs when the received packet belongs to a known flow of packets.

16. The network device of claim 10, wherein:
the one or more integrated circuits are configured to determine a type of application corresponding to the received packet; and
the selection engine is configured to select one of the software forwarding engine or the hardware forwarding engine to process the received packet is further based on the determined type of application corresponding to the received packet.

17. The network device of claim 10, wherein the selection engine is configured to:
determine at least one of i) a processing load of the software forwarding engine, and/or ii) a processing load of the hardware forwarding engine; and
use at least one of i) the processing load of the software forwarding engine, and/or ii) the processing load of the hardware forwarding engine to select the one of the software forwarding engine or the hardware forwarding engine.

18. The network device of claim 17, wherein the selection engine is configured to:
determine a level of utilization of a ternary content addressable memory (TCAM) utilized by the hardware forwarding engine; and
use the level of utilization of the TCAM to select the one of the software forwarding engine or the hardware forwarding engine.

* * * * *